(12) United States Patent
Belkheir et al.

(10) Patent No.: US 10,992,983 B2
(45) Date of Patent: Apr. 27, 2021

(54) METHOD FOR RECOVERING A TARGET FILE OF AN OPERATING SOFTWARE AND DEVICE FOR USE THEREOF

(71) Applicant: SAGEMCOM BROADBAND SAS, Rueil Malmaison (FR)

(72) Inventors: Cedric Belkheir, Rueil Malmaison (FR); Anthony Cammas, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/642,577

(22) PCT Filed: Jul. 25, 2018

(86) PCT No.: PCT/EP2018/070097
§ 371 (c)(1),
(2) Date: Feb. 27, 2020

(87) PCT Pub. No.: WO2019/042664
PCT Pub. Date: Mar. 7, 2019

(65) Prior Publication Data
US 2020/0351544 A1    Nov. 5, 2020

(30) Foreign Application Priority Data
Aug. 30, 2017   (FR) ...................................... 1757999

(51) Int. Cl.
*H04N 7/16* (2011.01)
*H04N 21/433* (2011.01)
(Continued)

(52) U.S. Cl.
CPC ........... *H04N 21/4334* (2013.01); *G06F 8/65* (2013.01); *H04N 21/23617* (2013.01);
(Continued)

(58) Field of Classification Search
CPC ......... H04N 21/4334; H04N 21/23617; H04N 21/26291; H04N 21/432; H04N 21/4435;
(Continued)

(56) References Cited

U.S. PATENT DOCUMENTS 5,144,425 A * 9/1992 Joseph .................. H04N 19/37
375/240.05
6,263,022 B1 * 7/2001 Chen .................... H04N 19/126
375/240.03

(Continued)

OTHER PUBLICATIONS

International Search Report as issued in International Patent Application No. PCT/EP2018/070097, dated Oct. 9, 2018.

*Primary Examiner* — Michael B. Pierorazio
(74) *Attorney, Agent, or Firm* — Pillsbury Winthrop Shaw Pittman LLP

(57) ABSTRACT

A method is directed to recovering a target file by an audio/video receiving equipment, the audio/video receiving equipment including at least two communication interfaces, including a first communication interface able to receive broadcast data and a second communication interface able to establish a bidirectional dialog with a server. The method makes possible to make data available simultaneously: in the "normal" direction, from the beginning to the end, on an IP interface via a file server (HTTP/FTP/etc.); in the "reverse" direction, from the end to the beginning, on a broadcast interface via a DSM-CC carousel, referred to as a dedicated channel. Thus the audio/video reception equipment can efficiently recover the data by simultaneously using two communication interfaces including at least one unidirectional interface.

12 Claims, 2 Drawing Sheets

(51) Int. Cl.
*G06F 8/65* (2018.01)
*H04N 21/236* (2011.01)
*H04N 21/262* (2011.01)
*H04N 21/432* (2011.01)
*H04N 21/443* (2011.01)
*H04N 21/458* (2011.01)
*H04N 21/643* (2011.01)
*H04N 21/6433* (2011.01)
*H04N 21/81* (2011.01)

(52) U.S. Cl.
CPC ..... *H04N 21/26291* (2013.01); *H04N 21/432* (2013.01); *H04N 21/4435* (2013.01); *H04N 21/4586* (2013.01); *H04N 21/6433* (2013.01); *H04N 21/64322* (2013.01); *H04N 21/818* (2013.01)

(58) Field of Classification Search
CPC ......... H04N 21/4586; H04N 21/64322; H04N 21/6433; H04N 21/818; H04N 21/8166
USPC ....................................................... 725/142
See application file for complete search history.

(56) References Cited

U.S. PATENT DOCUMENTS

| | | | | |
|---|---|---|---|---|
| 6,490,705 | B1 * | 12/2002 | Boyce | H04N 19/66 375/E7.088 |
| 6,496,217 | B1 * | 12/2002 | Piotrowski | H04N 21/234318 348/14.08 |
| 6,501,797 | B1 * | 12/2002 | van der Schaar | H04N 19/146 375/240.12 |
| 6,674,477 | B1 * | 1/2004 | Yamaguchi | H04N 19/176 348/387.1 |
| 7,095,782 | B1 * | 8/2006 | Cohen | H04N 21/234327 348/410.1 |
| 7,958,532 | B2 * | 6/2011 | Paul | H04N 21/631 725/90 |
| 8,064,389 | B2 * | 11/2011 | Khan | H04L 1/0041 370/329 |
| 8,072,943 | B2 * | 12/2011 | Khan | H04H 20/30 370/335 |
| 8,284,845 | B1 * | 10/2012 | Kovacevic | H04N 21/44016 375/240.26 |
| 8,467,656 | B2 * | 6/2013 | Kamio | H04N 9/8042 386/200 |
| 8,767,776 | B2 * | 7/2014 | Bunn | H04L 69/04 370/474 |
| 8,904,445 | B2 * | 12/2014 | Britt | H04N 21/4334 725/58 |
| 9,495,998 | B2 * | 11/2016 | Asano | H04N 5/783 |
| 9,769,230 | B2 * | 9/2017 | Hannuksela | H04N 21/234327 |
| 2002/0128029 | A1 | 9/2002 | Nishikawa et al. | |
| 2004/0208239 | A1 * | 10/2004 | Karlsson | H04K 3/82 375/219 |
| 2007/0179948 | A1 * | 8/2007 | Jennings, III | H04L 67/104 |
| 2008/0062168 | A1 * | 3/2008 | Poullier | H04N 1/00132 345/419 |
| 2008/0170630 | A1 * | 7/2008 | Falik | H04L 47/26 375/240.29 |
| 2009/0034629 | A1 * | 2/2009 | Suh | H04H 20/57 375/240.27 |
| 2009/0187960 | A1 * | 7/2009 | Lee | H04N 21/234327 725/131 |
| 2009/0222855 | A1 * | 9/2009 | Vare | H04L 12/189 725/39 |
| 2009/0268806 | A1 * | 10/2009 | Kim | H04N 21/4408 375/240.01 |
| 2010/0058421 | A1 | 3/2010 | Hastings et al. | |
| 2010/0260254 | A1 * | 10/2010 | Kimmich | H04N 21/631 375/240.01 |
| 2010/0260268 | A1 * | 10/2010 | Cowan | H04N 19/46 375/240.25 |
| 2011/0002397 | A1 * | 1/2011 | Wang | H04N 19/30 375/240.26 |
| 2011/0083154 | A1 * | 4/2011 | Boersma | H04N 21/637 725/109 |
| 2011/0096828 | A1 * | 4/2011 | Chen | H04N 21/44209 375/240.02 |
| 2011/0164683 | A1 * | 7/2011 | Takahashi | H04N 19/70 375/240.16 |
| 2011/0187503 | A1 * | 8/2011 | Costa | H05K 7/1498 340/8.1 |
| 2011/0239078 | A1 * | 9/2011 | Luby | H04N 21/234327 714/752 |
| 2011/0289542 | A1 * | 11/2011 | Kitazato | H04N 21/2625 725/115 |
| 2012/0096495 | A1 | 4/2012 | Maysunaga | |
| 2012/0185907 | A1 * | 7/2012 | Park | H04N 21/242 725/110 |
| 2012/0224651 | A1 * | 9/2012 | Murakami | H04L 25/03898 375/295 |
| 2012/0250619 | A1 * | 10/2012 | Twitchell, Jr. | H04W 40/28 370/328 |
| 2012/0320168 | A1 * | 12/2012 | Yun | H04N 21/4345 348/51 |
| 2013/0136193 | A1 * | 5/2013 | Hwang | H04L 65/80 375/240.27 |
| 2013/0305304 | A1 * | 11/2013 | Hwang | H04N 21/2362 725/109 |
| 2014/0050458 | A1 * | 2/2014 | Mochinaga | H04N 13/337 386/239 |
| 2014/0098289 | A1 * | 4/2014 | Jang | H04N 7/0117 348/441 |
| 2014/0115472 | A1 * | 4/2014 | Mochinaga | H04N 13/189 715/719 |
| 2014/0119712 | A1 * | 5/2014 | Jang | G11B 20/10 386/248 |
| 2014/0204177 | A1 * | 7/2014 | Hattori | H04N 19/44 348/43 |
| 2014/0211861 | A1 * | 7/2014 | Lee | H04N 19/33 375/240.27 |
| 2017/0164033 | A1 * | 6/2017 | Tsukagoshi | H04N 21/236 |

* cited by examiner

METHOD FOR RECOVERING A TARGET FILE OF AN OPERATING SOFTWARE AND DEVICE FOR USE THEREOF

CROSS-REFERENCE TO RELATED APPLICATIONS

This application is the U.S. National Stage of PCT/EP2018/070097, filed Jul. 25, 2018, which in turn claims priority to French patent application number 1757999 filed Aug. 30, 2017. The content of these applications are incorporated herein by reference in their entireties.

TECHNICAL FIELD OF THE INVENTION

One object of the invention is a method for recovering a target file as well as devices for using such a method.

The field of the invention is that of audio/video receiving equipment and more particularly that of updating such equipments.

A target file is, for example, an operating software of an audio/video equipment or a video file.

STATE OF PRIOR PART

An audio/video receiving equipment is a processing device capable of receiving analog or digital signals, and to shape these signals such that they are viewable on a screen, for example a television. Conventionally, such an equipment includes:
  radio terrestrial, radio satellite and/or wire input interfaces; and
  at least one output interface, for example a hdmi, display port, peritel interface or other.

Such an equipment is generally called a "box" or even "set top box". It is the base equipment provided by television providers.

Conventionally, an audio/video receiving equipment makes it also possible to browse the Internet, to access rerun services, to access services.

An audio/video receiving equipment is generally driven by a remote controller. This can be a conventional remote controller or a mobile phone directly connected to the equipment or to a same local area network as the equipment. Such an equipment can be integrated into a TV set.

Such an equipment includes an operating system to manage interaction of its functionalities with commands issued by a user. This operating system is also called a "firmware". It is usual to be able to update the firmware in order to enable the equipment to adapt to the evolution of functionalities.

The solution of the state of the art consists in broadcasting, on a dedicated channel via data packets, packets corresponding to instruction codes of the operating system. These packets are broadcast continuously, cyclically one after the other. That is after the last packet is broadcast, broadcasting resumes with the first packet. Therefore, it is sufficient that the equipment listens to the dedicated channel to recover all the data packets the assembly of which will enable it to update its operating system. Conventionally, a data packet includes an identifier which is comprised of a version number and an order number in the version. The ordered assembly of all the packets of a version enables the file corresponding to the operating system to be reconstituted.

This system has the drawback of being long. Indeed, the order of magnitude of the size of an operating system for an audio/video receiving equipment is 130 Mb. On a satellite reception interface, given that the update channel has a narrow pass-band for cost efficiency reasons, it can represent a recovery time in the order of 17 minutes with a 1 Mbps rate, which is not standard. In the case of a new equipment delivered without an operating system, or with a minimum operating system, this time can be regarded as very disappointing.

DISCLOSURE OF THE INVENTION

The invention solves this problem of updating the operating system of an audio/video receiving equipment by teaching the use of several distinct broadcast interfaces at least one of which is without a backward channel. This is also referred to as a non-connected broadcast interface. The invention generally enables the recovery of a target file which can also be a video file which has to be pushed onto an audio/video receiving equipment to be optimised, the video file having to be pushed, for example, further to a transaction on a video on demand platform.

The general principle of the invention is to make data available simultaneously:
  in the "normal" direction, from beginning to end, on an IP interface via a file server (HTTP/FTP/ . . . );
  in the "reverse" direction, from end to beginning, on a broadcast interface via a DSM-CC carousel, referred to as a dedicated channel.

Thus, the audio/video receiving equipment acquires data on both interfaces simultaneously:
  the audio/video receiving equipment is connected to the DSM-CC carousel and begins to receive data from a Pn packet (which is the packet present on the carousel at the time when the STB connects);
  the carousel broadcasts data in the reverse order, the audio/video receiving equipment receives packets Pn, Pn-1, Pn-2 . . . from the carousel,
  at the same time, the audio/video receiving equipment connects to a server by the IP network and requests it the packets by normal order beginning with packet Pn+1 and then Pn+2, etc.
  when one of the interfaces reaches one end of the file, it turns back and continues from the other end: when the carousel reaches the first packet P0, it continues from the last packet PN (normal operation for a carousel), and when the IP downloading reaches the last packet PN, it continues from the first packet P0.

The downloading is ended when all the data of the target file have been acquired.

One object of the invention is thus a method for recovering a target file by an audio/video receiving equipment, said audio/video receiving equipment including at least two communication interfaces, a first communication interface able to receive broadcast data and a second communication interface able to establish a bidirectional dialog with a server, characterised in that the method includes the following steps of:
  connecting the first communication interface on a predetermined channel broadcasting target data, the data being structured as packets, each packet being of a type among predefined types;
  receiving, via the first communication interface a description packet including information about the structure of the data packets making up the target file;
  allocating a storage zone of a determined size according to the description, each packet being associated with a size, the size of the storage zone is equal to the sum of the packet sizes;

receiving via the first interface a first data packet, each data packet including:
  a packet rank identifier representing the rank of the packet among all the packets of the target file;
  data in an amount such as described by the description packet received;
transmitting a first request via the second communication interface to obtain the target file from a determined request position from the position in the target file of the first packet received;
recording the data received by the first interface in the allocated storage zone, each data packet being recorded from a position equal to the sum of the sizes of the packets of a lower rank than its own in the storage zone;
recording of data received by the second interface in the allocated storage zone, the received bytes being continuously recorded from the position used by the first request in the storage zone;
stopping recordings when the allocated storage zone is full.

Beside the main characteristics just mentioned in the previous paragraph, the method/device according to the invention can have one or more complementary characteristics among the following ones, considered individually or according to technically possible combinations:

the information about the packet structure includes at least one number of data packets to reconstitute the target file and at least one size Tp of a data packet associated with at least one packet rank;

the information about the packet structure includes the number of data packets to reconstitute the target file, the size of a packet being known a priori and all the packets having the same size;

the information about the packet structure includes the size of a packet and the size of the target file;

the data are received in different orders on both interfaces;

the data packets received via the first interface are received in decreasing rank;

if the value obtained by adding the position used by the first request with the amount of data obtained in response to the first request becomes higher than or equal to the size of the allocated storage zone, then the method includes the following steps of:
  ending recording the received data by the second interface in response to the first request;
  transmitting a second request via the second communication interface to obtain the target file from a request position equal to 0;
  recording the data received by the second interface, in response to the second request, in the allocated storage zone, the received bytes being continuously recorded from the position used by the second request in the storage zone;

if the current writing position, in the storage zone, of data received via the second interface has been lower than the current writing position, in the storage zone, of data received via the first interface, and if the current writing position, in the storage zone, of data received via the second interface becomes higher than the current writing position in the storage zone of data received via the first interface, then the method implements the following steps of:
  ending recording the data received by the second interface;
  transmitting a third request via the second communication interface to obtain the target file from a request position equal to the position of a first missing packet;
  recording the data received by the second interface, in response to the third request, in the allocated storage zone, the received bytes being continuously recorded from the position used by the third request in the storage zone up to the size of the packet;
  repeating the previous steps as long as there are missing packets;
the data of a data packet received by the first interface are recorded in the storage zone only if the data packet identifier is associated, at the receiving equipment, with data absence information.

Another object of the invention is a non-transitory memory device including instruction codes for implementing the method according to one of the possible combinations of the previous characteristics.

Another object of the invention is an audio/video receiving equipment implementing a method according to one of possible combinations of the previous characteristics.

Another object of the invention is a computer program product comprising instructions which, when the program is executed by a computer, cause the same to implement the steps of the method according to one of possible combinations of the previous characteristics.

BRIEF DESCRIPTION OF THE FIGURES

Further characteristics and advantages of the invention will appear upon reading the following description, with reference to the appended figures, which illustrate.

For the sake of clarity, identical or similar elements are marked with identical reference marks throughout the figures.

The invention will be better understood upon reading the following description and upon examining the accompanying figures. These are shown by indicating and in no way limiting purposes of the invention.

DETAILED DESCRIPTION OF ONE EMBODIMENT

Figure 1:
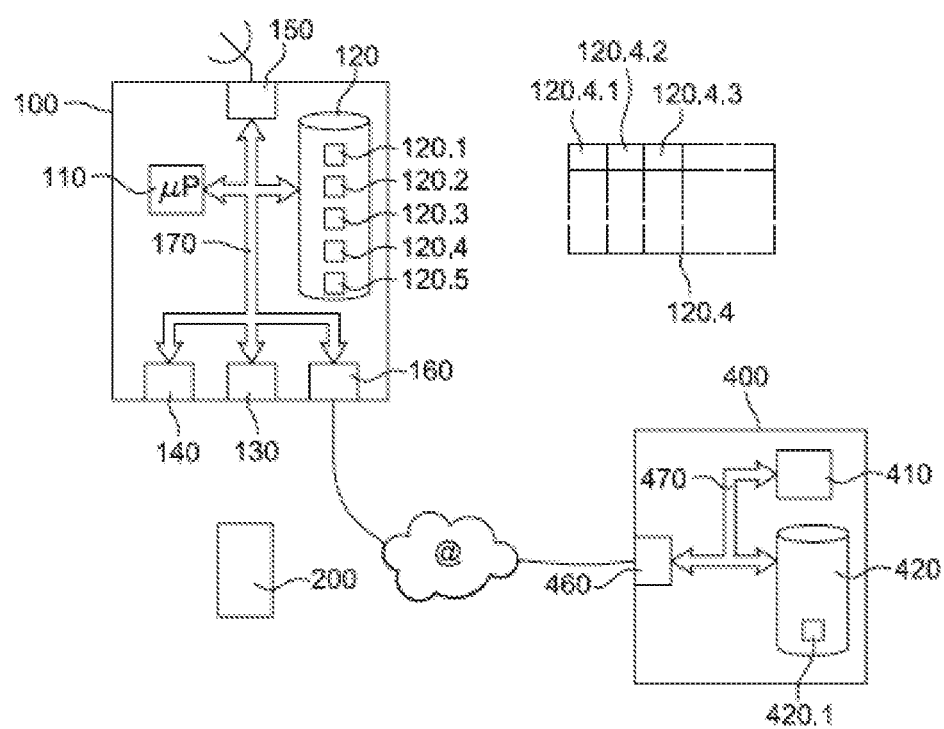
FIG. 1: an illustration of an audio/video receiving equipment able to implement the method according to the invention.

FIG. 1 shows an audio/video receiving equipment 100. FIG. 1 shows that the equipment 100 includes:
  a microprocessor 110;
  storage means 120. Storage means are, for example: a hard disk, a solid state disk, a memory component such as a flash memory;
  a communication interface 130 with a remote controller 200, for example an infrared communication interface or a radio communication interface;
  a communication interface 140 with a not represented screen, for example a peritel, hdmi, miracast, dvi, vga, communication interface;
  a first interface 150 for receiving a multimedia broadcast. Such an interface is for example an interface to the television broadcast terrestrial digital network, or an interface to a satellite broadcast network. This first interface is without a backward channel. Therefore, this is a unidirectional communication interface;

a second communication interface 160 able to establish connections through a network 300, for example the Internet network.

FIG. 1 shows that the microprocessor 110 of the audio/video receiving equipment 100, the storage means 120 of the audio/video receiving equipment 100, the communication interface 130 with the remote controller of the audio/video receiving equipment 100, the communication interface 140 with the screen of the audio/video receiving equipment 100, the first interface 150 for receiving the audio/video receiving equipment 100 and the second communication interface 160 of the audio/video receiving equipment 100 are interconnected through a bus 170.

In this description, when an action is taken by a device, this action is actually made by a microprocessor of said device controlled by instruction codes recorded in a memory of said device. In the same way, if an action is taken by a program, or an application, this action is the result of the implementation of instruction codes by a microprocessor of a device in which the program or application is installed.

FIG. 1 shows that the storage means 120 of the audio/video receiving equipment include several zones:
  an operating system zone 120.1;
  an update management zone 120.2 including instruction codes which, when the corresponding program is executed by the equipment cause the same to implement the steps of the method according to the invention. The zone 120.2 can be included in the operating system zone 120.1. The zone 120.2 can also correspond to a startup program type specific memory;
  a configuration zone 120.3 which includes:
    an identifier of a target data packet receiving channel, this identifier being, for the purposes of the invention, predetermined and factory indicated or set by manual configuration;
    an identifier of a file delivery server, this address being, for the purposes of the invention, predetermined and factory indicated or set by manual configuration;
  a data packet database zone 120.4 to perform tracking of update advance;
  a target file storage zone 120.5 to record a target file of the operating system before the update replaces the current version in the operating system zone 120.1.

FIG. 1 shows that the data packet database zone 120.4 is structured to enable a packet identifier 120.4.1 to be associated, according to the embodiments, with all or part of the following information:
  packet size;
  packet reception status. This status varies depending on whether the packet has been properly received and recorded in the update storage zone or not.

A case where the packet size is optional is when all the packets have the same size. An equivalent case is when all the packets have the same size except for one, the last one.

FIG. 1 shows a file delivery server 400. FIG. 1 shows that the server 400 includes:
  a microprocessor 410;
  storage means 420;
  a communication interface 460 able to establish connections through the network 300.

FIG. 1 shows that the microprocessor 410 of the delivery server, the storage means 420 of the delivery server and the communication interface 460 of the delivery server are interconnected through a bus 470.

FIG. 1 shows that the storage means 420 of the delivery server includes a zone 420.1 in which target files are recorded, each target file being identified at least by its version. In one alternative, the files are also identified by a model, that is by an identifier of the audio/video receiving equipment to which they are adapted. In yet another alternative, the version number is related to the model, that is knowing the version number, the model is implicit.

The server 400 is a server compatible with at least the http protocol.

Figure 2:
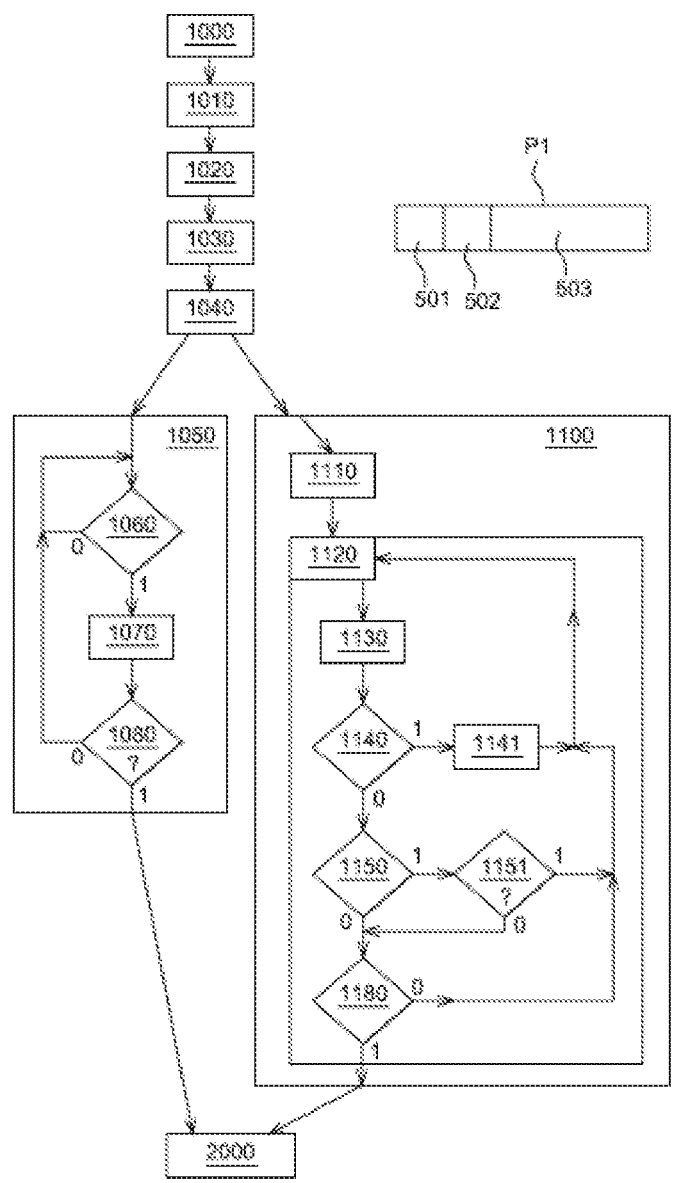
FIG. 2: an illustration of steps of the method according to the invention.

FIG. 2 shows an initial step 1000 in which the audio/video receiving equipment 100 has to manage a prompt to recover a target file. In our example, the target file is an update of the operating software of the equipment. This prompt can come from an internal schedule, a reset of the equipment or the activation of a menu by the user of the equipment. These are only examples possible of origins of prompts.

Further to this prompt, the audio/video receiving equipment proceeds to a step 1010 of connecting the first communication interface to the channel the identifier of which is recorded in the configuration zone of the storage means of the audio/video receiving equipment. On this channel, the equipment receives at least two packet types:
  description packets:
  data packets.

Each packet received is structured to enable its type and content to be read. Since the first interface is connected, the audio/video receiving equipment receives and processes all the broadcast packets.

In a step 1020 of receiving a description packet, following the connection step 1010, the audio/video receiving equipment receives a description packet. This is the first description packet broadcast since the connection step. In one alternative, this description packet is structured to contain at least:
  the number of packets enabling a file corresponding to the operating system to be reconstructed. In our example, it is considered that Mp data packets are needed to reconstitute an update file of the operating system;
  for each of the data packets enabling reconstruction, the size of the data contained in the packet.

In practice, the description packet also includes data relating to a version number of the file described. This enables the audio/video receiving equipment to determine whether the description packet is compatible with itself. The equipment selects for an update only the description packets which are compatible with itself. This selection is carried out, for example, via a model identifier contained in the description packet. This model identifier of the description packet should correspond to a model identifier recorded in the configuration zone. In one alternative, this model identifier is part of a version identifier. For the rest of the description, this version identifier is implicitly used to select the data packets retained among the data packets received via the first interface.

In practice, there are several alternatives to describe a target file in a description file. It is considered, as an example, that the description packet includes:
  the size of the target file, and
  the size of each packet. It can be one and only one size, each data packet having the same size, or a list of sizes, each size of the list being associated with a data packet identifier.

In one alternative, the header of a data packet includes a size identifier, this identifier referring to a size in a list of sizes. This list of sizes is either known a priori, or transmitted via the description packet.

In yet another alternative, the size of a data packet is known a priori and each data packet has the same size. Thereby, it is sufficient that the description packet contains the size of the target file for the number of data packets to be deduced by simply dividing the size of the target file by the known size of a data packet.

The common feature of all these alternatives is that between data transmitted by the description packet and data known a priori, it is possible, by a simple arithmetic, to calculate the position of a data packet in the target file.

There is also an alternative in which the description file only contains the size of the target file and no other data is known a priori. In this alternative, it is the header of a data packet which includes the position of the data packet in the target file. In this alternative, the header of the data packet also includes the size of the data packet.

It is reminded that the size of a data packet is, in this document, the size of the data contained by this data packet.

Once the description of the target file is known, the principle is therefore that the equipment selects, among the description packets received, the first description packet corresponding thereto. This correspondence relates to the equipment model and the update version. The equipment could possibly filter the update version and choose to only recover a version subsequent to the already installed operating system version. One alternative could be to accept all the versions in the case of an emergency restoration of the equipment as a result, for example, to a corruption of the operating system of the equipment or to a forced update request. At the end of step 1020 of receiving a description packet, the equipment is thus capable of selecting data packets among those received via the first interface. Since this behaviour is comparable with that of the state of the art, in the rest of the description, this selection is considered as implicit and only the identifier of the packet, that is its rank in all the packets forming the update, is considered.

The audio/video receiving equipment then proceeds to a step 1030 of allocating a storage zone. This storage zone is managed by a database. This is a database previously described in connection with the database zone of the storage means of the audio/video receiving equipment.

In the allocation step 1030, the audio/video receiving equipment uses data obtained to calculate the size of the storage zone 120.5 of an update file. This size is obtained by summing the size of each of the packets described by the previously received description packet. If all the packets have the same size, the size of the storage zone is the result of the product of the number of packets by the size of a packet. This case is considered in the rest of the description, each data packet having a size Tp, that is it contains Tp data bytes. In this case, the size of the storage zone of the update file is equal to Mp×Tp in bytes.

In the allocation step 1030, the audio/video receiving equipment also initialises the packet database by associating with each packet identifier, the "not received" or "KO" status. In our example, the data packets are identified by their rank from 1 to Mp. In other example, the rank, thus the identifier, of the packet can be its position, expressed in bytes, in the update file. In other words, it would be a byte offset from the update beginning to the beginning position of the packet.

The audio/video receiving equipment then proceeds to a step 1040 of receiving a first data packet P1 via the first interface. The first data packet, as all the data packets, is structured to include at least the following data:
  a packet type 501. The possible types are at least "description" and "data";
  a packet identifier 502. In our case, this is an integer between 1 and Mp;
  a payload zone 503 including Tp data bytes.

In this step of receiving a first data packet, the audio/video receiving equipment performs the following actions:
  it records the data of the packet at the desired position in the storage zone of the update file. The desired position, with the parameters of the example, is equal to: (rank of the packet−1)×packet size
  it updates the packet database for the packet identifier. To perform this update, it modifies the packet status depending on the record operation result: the status is "OK" if the record went well, otherwise the status is "KO";
  it stores in memory the rank of the first recorded data packet.

And then, the audio/video receiving equipment initiates two processes which are carried out in parallel:
  a first process 1050 for recording data packets received via the first interface;
  a second process 1100 for recovering data of the update file from the delivery server 400.

The entrance to the first process 1050 is a step 1060 of waiting for receipt of a data packet via the first interface. If a data packet is received via the first interface, then it is proceeded to a step 1060 of recording the data packet. Otherwise, one keeps waiting.

In the step 1070 of recording the data packet, the audio/video receiving equipment performs the following actions:
  it checks the packet status in the database, and if this status is "KO", then:
    it records the data of the packet at the desired position in the storage zone of the update file.
  It updates the packet database for the packet identifier.

The audio/video receiving equipment then proceeds to a step 1080 in which it checks whether the update file has been fully received. This check is made by making sure that, in the packet database, all the packets have a status being "OK". If yes, then it is proceeded to a step 2000 of ending receiving the update file, otherwise, it is proceeded to the step 1060 of waiting for receiving a packet.

In the invention, on the update channel, the data packets are broadcast in a decreasing rank order. That is the data packet which will be broadcast after the packet of rank N will be the data packet of rank N−1. The update file is, in some way, broadcast backwards.

The entrance to the second process 1100 is a step 1110 of transmitting a first request, via the second interface, to the delivery server. This request is a request according to the http, or https protocol. The parameters of this request are:
  an identifier of the file to be downloaded, this identifier being obtained via the description packet and/or the model of the audio/video receiving equipment;
  a downloading startup position, this position being equal to the sum of the sizes of the packets of a rank lower than or equal to the rank of the first packet received. In our example, this position is equal to the size of a packet multiplied by the rank of the first packet received. This corresponds to the position in the target file of the first packet received, at which position the size of the first packet received is added. This position is thus calculated depending on the position in the target file of the first packet received. The calculation mode depends on the description mode used by the description packet.

The audio/video receiving equipment then proceeds to a step 1120 in which it receives, as in response to the first request, data via the second interface. These data are data of the update file corresponding to packets of ranks higher than the rank of the first data packet received. The audio/video receiving equipment.

Figure 3:
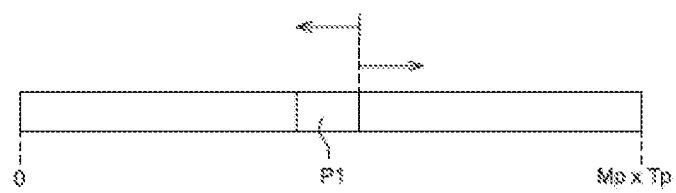
FIG. 3: an illustration showing how the first or second process record data.

In step 1120 of receiving data via the second interface, the audio/video receiving equipment records data received via the second interface in a storage zone of the update file from a position equal to the download startup position for the request the response of which is received. The packet identifier the status of which is to be updated is deduced from:
- the request startup position;
- the total amount of data received in response to the request. FIG. 3 illustrates that:
- the first process records data from the first packet received towards the beginning of the update file;
- the second process records data from the end of the first packet received towards the end of the update file.

In step 1120 of receiving data in response to the first request, the audio/video receiving equipment updates the packet database as it receives data. Each time Tp bytes are received, the audio/video receiving equipment updates the status of the corresponding packet in the packet database. This is a sub-step 1130 of step 1130 of updating the packet database.

The sub-step 1130 of updating the packet database is followed by a sub-step 1140 of checking the end of the file is reached.

If the end of the file is reached, then it is proceeded to a step of transmitting 1141 a second request via the second communication interface to obtain the update file from a request position equal to 0. It is understood that the processings corresponding to the previously active request are interrupted. The processing is then continued in step 1120 of receiving data via the second interface.

If the end of the file is not reached, then it is proceeded to a step 1150 of checking for a cross over between the first process and the second process. This step is optional. If this step is not implemented, then it is proceeded to a step 1180 of checking whether the update file is full or not.

A cross over happened if the current writing position, in the storage zone, of data received via the second interface has been lower than the current writing position, in the storage zone, of data received via the first interface, and if the current writing position, in the storage zone, of data received via the second interface becomes higher than the current writing position, in the storage zone, of data received via the first interface. Actually, it is reminded that the first process records packets towards the beginning of the update file, whereas the second process records packets towards the end of the update file.

If a cross-over took place, it is proceeded to a step 1151 of searching for a missing packet in the packet database. For this search, the audio/video receiving equipment scrolls through the packet database in the increasing rank order to find a packet the status of which is "KO". Such a packet, found after a cross-over, is a missing packet, that is a packet which has been poorly, or not, received via the first interface. The scrolls begins from the last packet received via the second interface.

If a packet is missing, then it is proceeded to a step 1152 of transmitting a third request via the second communication interface to obtain the update file from a request position equal to the position of the missing packet in the storage zone of the update file. It is understood that the processings corresponding to the previously active request are interrupted. The processing is then continued in step 1120 of receiving data via the second interface.

If no packet is missing, it is proceeded to step 1180 in which the audio/video receiving equipment checks whether the update file has been fully received. This step is identical to step 1080 of the same name for the first process. If the update file is full, then it is proceeded to step 2000 of ending receiving the update file, otherwise, it is proceeded to step 1120 of receiving data via the second interface.

In step 2000 of ending receiving the update file, the audio/video receiving equipment uses the content of the storage zone 120.5 of the update file to update the operating system zone 120.1.

With the invention, it is thus possible to substantially accelerate recovery of an update file of an operating system of an audio/video receiving equipment. Impacts external to the equipment are negligible:
- no impact at the delivery server 400, the standard capabilities of the http protocol are used;
- in broadcasting packets via the unidirectional broadcast interface, the order of broadcasting data packets is reversed.

The invention is particularly efficient when both data recovery processes write in opposite directions. In other words, the data are received in a different order on both interfaces. In the exemplary implementation described, the first process writes data received in decreasing order towards the beginning of the file, whereas the second process writes data received in increasing order towards the end of the file. This is the most elegant case because it only involves few modifications at the equipment as well as at the infrastructure.

The principle of the invention is still applicable, if data packets are received in increasing order on the first interface. In this case, the data should be received in reverse order, that is in decreasing order, on the second interface, and they should be written towards the beginning of the file. Such a result can be achieved, for example, by recording the files backwards on the delivery server or by reading them from end to beginning.

The invention is also perfectly operational for recovering any type of file, for example video files.

The invention claimed is:

1. A method for recovering a target file by an audio/video receiving equipment, said audio/video receiving equipment including at least two communication interfaces, including a first communication interface able to receive broadcast data and a second communication interface able to establish a bidirectional dialog with a server, the method comprising:
   connecting the first communication interface on a predetermined channel broadcasting target data, the data being structured as packets, each packet being of a type among predefined types;
   receiving via the first communication interface a description packet including information about the structure of the data packets making up the target file;
   allocating a storage zone of a determined size according to the description, each packet being associated with a size, the size of the storage zone being equal to the sum of the packet sizes;
   receiving via the first interface a first data packet, each data packet including:
   a packet rank identifier representing the rank of the packet among all the packets of the target file;
   data in an amount such as described by the description packet received;

transmitting a first request via the second communication interface to obtain the target file from a determined request position from the position in the target file of the first packet received;

recording the data received by the first interface in the allocated storage zone, each data packet being recorded from a position equal to the sum of the sizes of the packets of a lower rank than its own in the storage zone;

recording data received by the second interface in the allocated storage zone, the bytes received being continuously recorded from the position used by the first request in the storage zone;

stopping recordings when the allocated storage zone is full.

2. The method for recovering a target file according to claim 1, wherein the information about the packet structure includes at least one number of data packets to reconstitute the target file and at least one size Tp of a data packet associated with at least one packet rank.

3. The method for recovering a target file according to claim 1, wherein the information about the packet structure includes the number of data packets to reconstitute the target file, the size of a packet being known a priori and all the packets having the same size.

4. The method for recovering a target file according to claim 1, wherein the information about the packet structure includes the size of a packet and the size of the target file.

5. The method for recovering a target file according to claim 1, wherein the data are received in different orders on both interfaces.

6. The method for recovering a target file according to claim 5, wherein the data packets received via the first interface are received in decreasing rank.

7. The method for recovering a target file according to claim 1, wherein when the value obtained by adding the position used by the first request with the amount of data obtained in response to the first request becomes higher than or equal to the size of the allocated storage zone, then the method includes the following steps of:

ending recording the received data by the second interface in response to the first request;

transmitting a second request via the second communication interface to obtain the target file from a request position equal to 0;

recording the data received by the second interface, in response to the second request, in the allocated storage zone, the bytes received being continuously recorded from the beginning of the storage zone.

8. The method for recovering a target file by an audio/video receiving equipment according to claim 1, wherein when the current writing position, in the storage zone, of data received via the second interface has been lower than the current writing position, in the storage zone, of data received via the first interface, and when the current writing position, in the storage zone, of data received via the second interface becomes higher than the current writing position in the storage zone of data received via the first interface, then the method implements the following steps of:

ending recording the data received by the second interface;

transmitting a third request via the second communication interface to obtain the target file from a request position equal to the position of a first missing packet;

recording the data received by the second interface, in response to the third request, in the allocated storage zone, the bytes received being continuously recorded from the position used by the third request in the storage zone up to the size of the packet;

repeating the previous steps as long as there are missing packets.

9. The method for recovering a target file according to claim 1, wherein the data of a data packet received via the first interface are recorded in the storage zone only if the data packet identifier is associated, at the receiving equipment, with data absence information.

10. A non-transitory memory device including instruction codes for implementing the method according to claim 1.

11. An audio/video receiving equipment implementing a method according to claim 1.

12. A computer program product including instructions which, when the program is executed by a computer, cause the same to implement the steps of the method according to claim 1.

* * * * *